United States Patent [19]

Binoth

[11] 4,132,455
[45] Jan. 2, 1979

[54] CIRCULAR TRANSFER TABLE

[75] Inventor: Walter Binoth, Jongny sur Vevey, Switzerland

[73] Assignee: ISM Equipements Industriels de Montage SA, Lausanne, Switzerland

[21] Appl. No.: 837,044

[22] Filed: Sep. 23, 1977

[51] Int. Cl.² .............................................. A47B 11/00
[52] U.S. Cl. ................................. 312/97.1; 312/202; 312/268; 108/104; 108/22
[58] Field of Search ..................... 312/97.1, 202, 268; 108/104, 142, 22

[56] References Cited

U.S. PATENT DOCUMENTS

| 777,492 | 12/1904 | Bruebach | 108/142 |
|---|---|---|---|
| 1,712,126 | 5/1929 | Taylor | 108/104 |
| 2,673,780 | 3/1954 | Lyon | 312/268 |
| 2,830,862 | 4/1952 | Wright | 108/104 |
| 2,902,741 | 9/1959 | Hankin, Jr. | 108/22 |
| 3,146,043 | 8/1964 | Johnson et al. | 312/97.1 |
| 3,159,441 | 12/1964 | Sikma | 312/268 |
| 3,437,057 | 4/1969 | Wulff | 108/22 |
| 3,615,068 | 10/1971 | Edelstein | 108/104 |

Primary Examiner—Victor N. Sakran
Attorney, Agent, or Firm—Haseltine, Lake & Waters

[57] ABSTRACT

A circular transfer table comprising a ring-shaped member having a central circular opening which is driven in rotation by a roller chain secured to the table and mounted in a circular slideway in a work table below the transfer table to leave the center of the transfer table a free space permitting mounting therein of tools or machinery.

1 Claim, 1 Drawing Figure

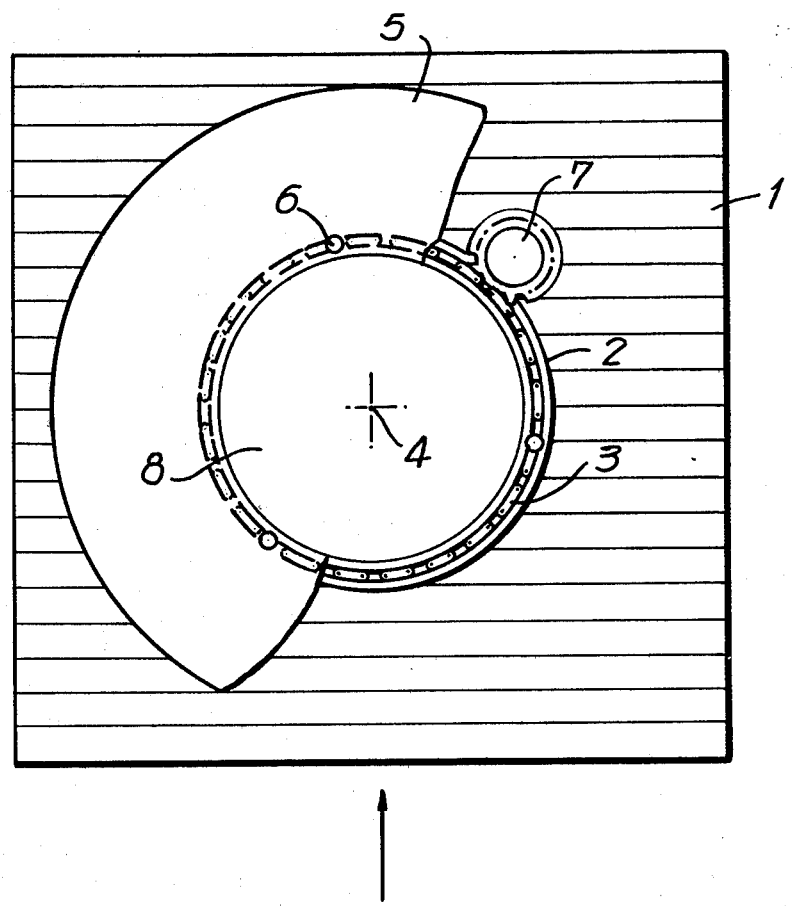

CIRCULAR TRANSFER TABLE

FIELD OF THE INVENTION

The present invention relates to a circular transfer table utilizable especially on a work table for the transfer of pieces from one work station to another.

BACKGROUND

Currently known are rotatable tables having a central axis of rotation. Such tables have a certain technical requirement in order for their operation to be reliable and consequently they are of high cost. Furthermore, their center cannot be utilized for the placement of auxiliary work tools.

SUMMARY OF THE INVENTION

The transfer table according to the invention is characterized by the fact that it has a central circular opening and by the fact that it is driven in rotation by a roller chain guided in a circular slideway leaving at the center a free space to permit the mounting of tools or other apparatus thereat.

BRIEF DESCRIPTION OF THE DRAWING

The sole FIGURE of the drawing shows, by way of example, a top plan view, partly broken away, of a work table provided with a transfer table according to the invention.

DETAILED DESCRIPTION

In the drawing there is seen a work table 1 which is provided with a circular slideway 2 in which is positioned an endless chain with rollers 3. The rollers of the chain can travel in slideway 2 and the chain undergoes a rotatable movement around the center 4 of the table. A transfer table 5 in the form of a ring-shaped member is fixed to the chain 3 by being secured to axles 6 of the rollers of the chain. Thus, the table 5 can undergo rotation around center 4 when the chain 3 is driven in the slideway 2. An opening in the slideway permits a pinion 7 to mesh with the chain and to drive the same from a motor (not shown). A circular opening 8 is provided in the center of the transfer table 5 to provide access to the stationary worktable 1.

The transfer table according to the invention thus has in respect of the conventional tables, the advantage of not including a central axle which provides a substantial economy in price as well as providing a location at the center of the transfer table for work operations. This authorizes access to the frame for attachment of automatic work stations or tools. It also becomes possible to leave the center of the work table 1 open to place thereat any apparatus traversing the middle of transfer table 5 for transfer and operation in their thickness.

The table 5 can be used by watch makers for making watches. It can carry parts which advance step-wise in front of an operator who is seated at the location indicated by the arrow.

Heretofore, the tables 5 have been rotated on a shaft placed in the center of the table. The center is now free for placing tools or other parts therein.

It is seen from the above that the invention contemplates a circular transfer table which comprises the ring-shaped member with the central opening and which is subjected to rotational drive by means provided on the underside thereof leaving the central opening completely opened.

Although the invention has been described in conjunction with a single embodiment thereof, it will become apparent to those skilled in the art that numerous modifications and variations can be made within the scope and spirit of the invention as defined in the attached claims.

What is claimed is:

1. The combination comprising a work table having a flat upper surface, a transfer table superposed on said upper surface of the work table, an annular slideway provided at said flat upper surface of said work table, an endless chain slidably received in said slideway, pinion means meshing with said chain for driving the chain in said slideway, said pinion means comprising a drive pinion, said slideway having an opening in which said drive pinion extends to engage said chain in driving relation, said chain including rollers and connecting axles, said connecting axles being secured to said transfer table at the lower surface thereof to drive the transfer table in rotation as the chain is driven in said slideway, said transfer table being constituted as a ring-shaped member having a central opening which is completely open and unobstructed, the upper surface of the work table being exposed beneath said central opening, said transfer table covering said slideway and chain and said pinion means, said ring-shaped member having an upper work surface.

* * * * *